May 21, 1968      W. L. SWANSON      3,383,711

PILOT FOR FLUSH VALVE AND MEANS TO ATTACH THE SAME

Filed May 27, 1965

INVENTOR.
WILBUR L. SWANSON

BY Dybvig & Dybvig

HIS ATTORNEYS

United States Patent Office 3,383,711
Patented May 21, 1968

3,383,711
PILOT FOR FLUSH VALVE AND MEANS
TO ATTACH THE SAME
Wilbur L. Swanson, 693 Far Hills Ave.,
Dayton, Ohio 45419
Filed May 27, 1965, Ser. No. 459,303
1 Claim. (4—56)

ABSTRACT OF THE DISCLOSURE

A pilot adapted to enter the effluent of a water tank to assist in seating a flush valve disposed in the tank. The pilot has fins adapted to react with water flowing through said effluent to apply a counter-clockwise torque to said pilot and said flush valve, thus protecting threaded fittings supporting the flush valve. The pilot has spaced and parallel peripheral flanges forming an annular groove which receives the margin surrounding a hole in the flush valve by one of the flanges entering thhe hole. To facilitate assembly, said one flange is notched to permit passage of the flange into the hole by a screwing action.

---

This invention relates to a pilot for a flush valve and more particularly to a pilot having an improved means for attachment to a flush valve, however the invention is not necessarily so limited.

An object of the present invention is to provide a new and improved flush valve pilot.

Another object of the present invention is to provide a flush valve pilot which includes novel means for attaching the pilot to a flush valve.

A further object of the invention is to provide a new and improved means to effect an attachment to a thin walled structure.

Other objects and advantages reside in the construction of parts, the combination thereof, the method of manufacture and the mode of operation, as will become more apparent from the following description.

In the drawing, FIGURE 1 is a transverse sectional view illustrating a device embodying the present invention and illustrating, in phantom detail, the attachment of such device to a conventional flush valve.

Figure 1:
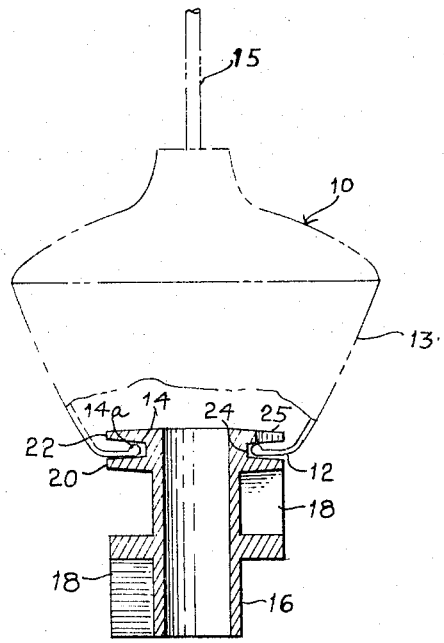
Figure 4:
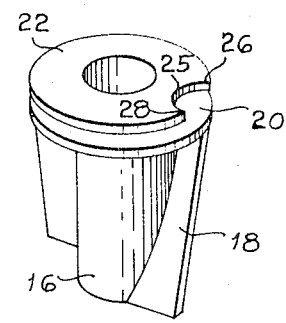
FIGURE 4 is a perspective view of the device of FIGURE 1.
Figure 2:
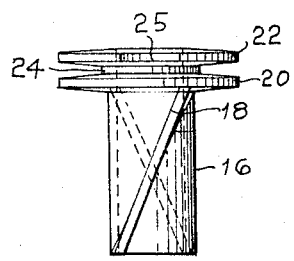
FIGURE 2 is a side elevation view of the device of FIGURE 1.

The flush valve pilot attachment illustrated in the drawing is of the type adapted to guide a flush valve into proper seating position on a valve seat. In a typical assembly the valve seat encircles an effluent opening located in the base of a tank which contains a liquid to be dumped or flushed. A typical flush valve or bulb 10 for such installation is shown in phantom detail in FIGURE 1.

The flush valve 10 is a hollow bulbous member constructed of a thin walled resilient material such as rubber, and having a generally circular base portion 12 supported by a frustum conical wall portion 13. A circular aperture 14 is located centrally in the base portion 12. The outer surface of the base portion 12 is substantially planar and, as shown, the interior surface of the base portion may have a bead 14a reinforcing the margin of the aperture 14.

A difficulty frequently encountered with flush valves of this type is that the valve does not seat symmetrically on the valve seat. The conical shape of the wall portion 13 helps to alleviate this problem since the valve will continue to seat and seal against leakage even though the flush valve may be tilted from the valve seat axis. However, such tilting of the flush valve stresses the mechanism, not shown, which is used to lift the flush valve for purposes of dumping or flushing, and the reaction of such mechanism to the tilted condition can produce a bias on the flush valve which partially lifts a portion of the flush valve off its seat, thus permitting a persistent leakage between the flush valve and its seat. Such leakage tends to erode the exterior wall of the flush valve, inducing premature failure of the flush valve.

In typical installations the liquid controlled by the flush valve is water and in many areas the water is a hard water which can deposit insoluble salts on the working elements of the flush mechanism. Such deposition or incrustation interferes with free operation of the flush valve, particularly in the movement of the stem 15 which supports the flush valve. The pilot device illustrated in the drawing alleviates both of these problems.

Thus, the pilot device depends from the flush valve in such fashion as to center the flush valve with respect to the effluent opening which forms the valve seat, not shown. This minimizes undesirable tilting of the flush valve. In addition, the device is equipped with helically disposed fins 18, which, on flushing, react with the water flowing downwardly through the effluent opening to impart a spin to the flush valve. The flush valve, being hollow as shown, is designed to be elevated above the liquid level in the tank being dumped and then released to float slowly down with the liquid being dumped, ultimately returning to its valve seat. This slow downward movement of the flush valve gives the stem 15 an opportunity to hang up on incrustations located on the mechanism which guides the downward movement of the stem. The spinning action imparted by the fins 18, particularly as the pilot moves close to the effluent opening, helps to dislodge the stem 15 from any obstruction against which the stem has lodged.

Figure 3:
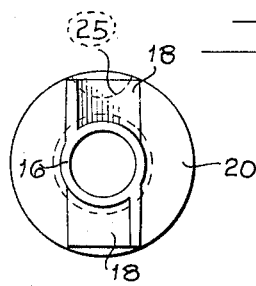
FIGURE 3 is a bottom plan view of the device of FIGURE 1.

An important feature of the present pilot construction resides in the direction of inclination of the fins 18. As shown in FIGURE 3, the fins descend helically in the clockwise direction with the result that liquid moving downwardly past the fins will impart a counterclockwise spin to the valve 10. Standard plumbing fixtures in this country employ right-handed screw threads 17 between the stem 15 and the valve 10 with the result that the counterclockwise torque exerted by the fins 18 operates to tighten the valve 10 on the stem 15.

The basic pilot attachment includes a hollow cylindrical body 16 from which project the fins 18. The fins each have an axial length exceeding the diameter of the body 16 and a projective radial width approximately one half the diameter of the body 16 so as to produce a spinning action effective for the purposes described. A deterrent to wide usage of pilot attachments of the general type illustrated in the drawing, has been the difficulty of installation. This difficulty is overcome in the present invention by an exceedingly simple and inexpensive attachment means. The improved attachment means comprises a first flange 20 encircling the body 16 and projecting radially therefrom and a second flange 22 spaced axially from the flange 20 and also projecting radially from the body 16.

The flange 22 differs from the flange 20 in that its periphery is interrupted by a notch 25 which defines circumferentially leading and trailing margins 26 and 28 in the flange 22. The specific notch shown is semicircular in shape, however, it will be appreciated by those skilled in the art that, for the purposes served by this notch, its shape is not critical and its circumferential extent, except as hereinafter noted is also not critical provided its circumferential extent is less than one half the periphery of the flange 22, i.e. less than 180°.

The cylindrical body 16 provides a shoulder 24 between the flanges 20 and 22. This shoulder preferably has a diameter less, but not substantially less, than the diameter of the aperture 14 in the flush valve. The axial separation between the flanges 20 and 22 is greater, but preferably not substantially greater, than the wall thickness of the flush valve. The confronting surfaces of the flanges 20 and 22 may have a slight taper, as shown, to facilitate removal of the device from a mold, the device being preferably of molded plastic construction.

It is important that the spinning action of the pilot be transmitted to the flush valve 10 to obtain the advantages previously described. With the present construction it is found that no special precautions are necessary to obtain the desired torque transmission. Thus, the fins 18 on the pilot attachment produce a spin due to a downward flow of fluid relative to the fins. This relative downward fluid flow also acts to bias the fins downward relative to the flush valve 10 with the result that the flange 22 is drawn into contact with the interior wall of the base portion 12. The pressure between the flange 22 and the interior wall of the valve 10 establishes a friction force which couples the pilot attachment to the valve 10 and prevents relative rotation between the two. This coupling appears to be enhanced by the presence of liquid being dumped between the flanges 20 and 22.

It is found that a suitable balance between the downward pull exerted on the pilot device by downwardly flowing water acting against the fins 18 and the rotary torque thereby generated, is achieved by fins which are each planar along their length and which have an outer margin equidistant from the periphery of the body 16 throughout the length thereof.

For convenient assembly of the pilot attachment to the flush valve it is desirable that the notch 25 in the flange 22 between the leading and trailing margins 26 and 28 be larger than the wall thickness of the bulb 10. Assembly is then conveniently accomplished by introducing the margin of the bulb 10 at the aperture 14 into the notch 25 between the leading and trailing margins 26 and 28, then rotating the attachment about its own axis in a direction to advance the flange 22 through the aperture 14. After a rotation of approximately 360° less the central angle subtended by the notch 25, the entire flange 22 will have been advanced into the interior of the bulb 10 with the result that the entire margin of the aperture 14 is seated in the channel formed between the flanges 20 and 22. Since the margin for the aperture 14 is continuous it is not possible to reverse this process and, accordingly, the pilot device, once attached to the bulb 10, will not separate from the bulb except by deliberate action.

To minimize the possibility of unintentional removal of the pilot device from the flush valve it is preferred that the diameter of the aperture 14 be as small as possible. Due to the flexibility of the bulb 10, the aperture 14 readily distorts to an oblong shape having a length approximately $\frac{3}{2}$ its diameter. As a result, the diameter distance between the radially innermost projection of the notch 25 and the periphery of the flange 22 opposite thereto can be as much as $\frac{3}{2}$ the diameter of the aperture 14 without the aperture 14 being too small to receive the flange 22 in the manner described. This being the case, it is preferred that the diameter of the aperture 14 be not substantially more than $\frac{2}{3}$ the distance between the radially innermost terminus of the notch 25 and the diametrically opposite margin of the flange 22, it being preferred that the diameter of the aperture 14 is not substantially less than the diameter of the shoulder 24.

Numerous advantages to the means by which the present device is attached to the flush valve will occur to those skilled in the art. Thus, the means for attachment eliminates the need for supplemental fastening devices such as rivets. Also, by relying on the fluid flow to develop a friction coupling between the flange 22 and the base 12, the pilot device readily accommodates flush bulbs having widely varying wall thicknesses. The diameter of the aperture 14 is also not critical since the pilot device once attached through the aperture 14 will be retained with any aperture diameter which is less than the diameter of the flange 22.

While the present invention has been described with reference to the attachment of a pilot device to a flush valve, it will be recognized by those skilled in the art that the subject attachment mechanism is applicable in general to the attachment of numerous types of devices to thin flexible apertured walls, the essential features of the attaching mechanism being a surface portion too large to enter the aperture provided in the flexible wall (flange 20), an annular disc-like body having a radially disposed notch therein (flange 22) and means holding the foregoing elements in spaced confronting relation (shoulder 24).

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

1. In combination, a bulbous flush valve, a stem to hang said valve, right-handed thread means interengaging said stem and said flush valve, said thread means tightening by a counterclockwise torque applied to said flush valve, a pilot attachment comprising an elongated cylindrical body member and flange means at one end of said body member to attach said body member in depending relation to said flush valve, said flange means resisting rotation between said valve and said pilot attachment, an axially inclined fin projecting radially outwardly of said body member, said fin descending helically in the clockwise direction from said one end of said body member, said fin being thereby adapted to react with liquid flowing downwardly past said pilot attachment to apply a counterclockwise torque to said pilot attachment, said counterclockwise torque, when applied, being transmitted by said flange means to said flush valve and by said flush valve to said thread means whereby said torque tends to tighten said thread means.

References Cited

UNITED STATES PATENTS

| | | | |
|---|---|---|---|
| 2,139,862 | 12/1938 | Shesler | 4—56 |
| 2,752,608 | 7/1956 | Schneider et al. | 4—56 |
| 2,788,525 | 4/1957 | Reichert | 4—56 |
| 3,144,664 | 8/1964 | Fonken | 4—57 |
| 1,062,635 | 5/1913 | Clements | 29—433 |
| 2,119,520 | 6/1938 | Brokering | 29—433 |
| 1,697,814 | 1/1929 | Forbes | 277—178 |

LAVERNE D. GEIGER, *Primary Examiner.*

H. K. ARTIS, *Assistant Examiner.*